US008692827B1

(12) United States Patent
Guskov et al.

(10) Patent No.: US 8,692,827 B1
(45) Date of Patent: Apr. 8, 2014

(54) CARVING BUILDINGS FROM A THREE-DIMENSIONAL MODEL, AND APPLICATIONS THEREOF

(75) Inventors: Igor Guskov, Ann Arbor, MI (US); Tushar Udeshi, Broomfield, CO (US)

(73) Assignee: Google Inc., Mountain View, CA (US)

(*) Notice: Subject to any disclaimer, the term of this patent is extended or adjusted under 35 U.S.C. 154(b) by 449 days.

(21) Appl. No.: 13/012,439

(22) Filed: Jan. 24, 2011

(51) Int. Cl.
*G06T 15/30* (2011.01)

(52) U.S. Cl.
USPC .......................................... 345/423; 345/420

(58) Field of Classification Search
None
See application file for complete search history.

(56) References Cited

U.S. PATENT DOCUMENTS

| | | | | |
|---|---|---|---|---|
| 5,819,016 | A * | 10/1998 | Watanabe et al. | 345/419 |
| 6,611,384 | B1 * | 8/2003 | Biverot | 359/630 |
| 6,930,682 | B1 * | 8/2005 | Livingston | 345/420 |
| 7,098,909 | B2 * | 8/2006 | Hayano et al. | 345/420 |
| 7,301,535 | B2 * | 11/2007 | Shen | 345/424 |
| 7,408,629 | B2 * | 8/2008 | Qwarfort et al. | 356/28 |
| 7,728,848 | B2 * | 6/2010 | Petrov et al. | 345/619 |
| 7,813,543 | B2 * | 10/2010 | Moden | 382/154 |
| 7,986,825 | B2 * | 7/2011 | Kochi et al. | 382/154 |
| 2001/0043738 | A1 * | 11/2001 | Sawhney et al. | 382/154 |
| 2007/0171223 | A1 * | 7/2007 | McArdle et al. | 345/420 |
| 2009/0132436 | A1 | 5/2009 | Pershing et al. | |
| 2010/0289817 | A1 * | 11/2010 | Meier et al. | 345/619 |
| 2011/0033110 | A1 * | 2/2011 | Shimamura et al. | 382/173 |
| 2011/0074783 | A1 * | 3/2011 | Coombes et al. | 345/426 |
| 2013/0057550 | A1 * | 3/2013 | Kishikawa et al. | 345/420 |

OTHER PUBLICATIONS

Verma et al. ("3D Building Detection and Modeling from Aerial LIDAR Data", IEEE Computer Society Conference on Computer Vision and Pattern Recognition, 2006).*
Manferdini et al. ("Reality-Based 3D Modeling, Segmentation and Web-Based Visualization", EuroMed 2010, LNCS 6436, pp. 110-124, 2010).*
Turk et al. ("Zippered Polygon Meshes From Range Images", SIGGRAPH '94 Proceedings of the 21st annual conference on Computer graphics and interactive techniques, pp. 311-318, Jul. 24-29, ACM 1994).*
Lee et al. ("Interactive 3D Building Modeling Using a Hierarchical Representation", Proceedings of the First IEEE International Workshop on Higher-Level Knowledge in 3D Modeling and Motion Analysis, 2003).*
Cobb, et al. ("A Rule-based Approach for the Conflation of Attributed Vector Data", GeoInformatica 2:1, 7-35, 1998).*

(Continued)

*Primary Examiner* — James A Thompson
*Assistant Examiner* — William Beutel
(74) *Attorney, Agent, or Firm* — Dority & Manning, P.A.

(57) ABSTRACT

Embodiments relate to carving three dimensional models of buildings out of larger models of city blocks to make way for more detailed models. In accordance with one aspect of the invention, a computer-implemented method for carving a building from a first three-dimensional model is described. The first three-dimensional model may represent a city block. The three-dimensional model may include a plurality of polygons which represent one or more buildings in a three-dimensional environment. One or more polygons are identified as a portion of a roof, and roof portions that are not discontinuous are combined in roof meshes. Based on a roof mesh, a three-dimensional volume portion of a three-dimensional model is determined, which may represent a first building. The first building representation may then be carved from the three-dimensional model.

20 Claims, 4 Drawing Sheets

(56) References Cited

OTHER PUBLICATIONS

Forlani et al. ("Building reconstruction and visualization from LIDAR data", The Int'l Archives of the Photogrammetry, Remote Sensing and Spatial Information Sciences, vol. XXXIV, Part 5/W12, 2004).*

Piekarski, Wayne and Bruce H. Thomas, "Interactive Augmented Reality Techniques for Construction at a Distance of 3D Geometry," IPT/EGBE 2003, Immersive Projection Technology/Eurographics Virtual Environments Conference May 22-23, 2003, Zurich, Switzerland, Eurographics Association, 10 pages.

* cited by examiner

CARVING BUILDINGS FROM A THREE-DIMENSIONAL MODEL, AND APPLICATIONS THEREOF

FIELD

This field relates to creating and visualizing three-dimensional models in a three dimensional environment.

BACKGROUND

Three-dimensional geographic information systems, such as Google Earth by Google Inc. of Mountain View, Calif., may allow users to view three-dimensional representations of buildings for select cities around the world. For example, using the Google Earth software, a user can navigate to New York, N.Y. and view a three-dimensional representation of most city buildings and popular landmarks.

Three-dimensional representations of buildings displayed by Google Earth may be automatically generated based on images taken by satellite at various angles. These representations allow users to view the general structure of a building, but may lack specific details for a particular building.

To display a more accurate representation of a particular building, a user may create a textured three-dimensional model of a building using a computer-aided design tool, such as Google Building Maker tool or a SketchUp tool, also by Google Inc. of Mountain View, Calif. Google Building Maker allows an individual user to create a three-dimensional representation of a building in the Google Earth software, and may allow a user to specify more detail than in an automatically generated model presently included by the Google Earth software. User generated representations may be stored in a database, such as the Google 3D Warehouse.

Once a user creates a more detailed representation of a building, it may be desirable to include it in the Google Earth three-dimensional world. This may be done by replacing the user generated model with the automatically generated model. However, Google Earth may utilize a single automatically generated model to represent an entire block of buildings in a city, while other models, such as a user generated model, may represent a small but well-defined portion of that block, such as an individual building or a quarter of a block. These two models cannot both be published at the same time in their original non-modified state. However, the smaller model may often be of better quality and may also correspond with a well defined business, placemark, or landmark. Thus, the GIS may either show a large, worse-quality, less detailed block, or show a single, better-quality, more detailed portion of a block in isolation.

BRIEF SUMMARY

Embodiments relate to carving three dimensional models of buildings out of larger models of city blocks to make way for more detailed models. In accordance with one aspect of the invention, a computer-implemented method for carving a building from a first three-dimensional model is described. The first three-dimensional model may represent a city block. The three-dimensional model may include a plurality of polygons which represent one or more buildings in a three-dimensional environment. One or more polygons are identified as a portion of a roof, and roof portions that are not discontinuous are combined in roof meshes. Based on a roof mesh, a three-dimensional volume portion of a three-dimensional model is determined, which may represent a first building. The first building representation may then be carved from the three-dimensional model.

In accordance with an aspect of the invention, a second three-dimensional model similar to a part of the first building representation may be identified by determining an amount of overlap between the two roof portions of the two buildings. If the overlap exceeds a threshold, the second three-dimensional model may be merged into the carved portion of the first three-dimensional model. The second three-dimensional model may represent a particular building more accurately than the first three-dimensional model. In accordance with a further aspect, the second three-dimensional model may be user generated, while the first three-dimensional model may be automatically generated.

In accordance with a further aspect, vertical surfaces are inserted into carved three-dimensional models to close holes left by the carving process.

Further embodiments, features, and advantages of the invention, as well as the structure and operation of the various embodiments of the invention are described in detail below with reference to accompanying drawings.

BRIEF DESCRIPTION OF THE DRAWINGS/FIGURES

Embodiments of the invention are described with reference to the accompanying drawings.

In the drawings, like reference numbers may indicate identical or functionally similar elements. The drawing in which an element first appears is generally indicated by the left-most digit in the corresponding reference number.

DETAILED DESCRIPTION

Embodiments relate to carving three dimensional models of buildings out of larger models of city blocks to make way for more detailed models. In embodiments, portions of the large, worse-quality, or less detailed block are carved out, and smaller, better quality, or more detailed portions of the block are inserted in the corresponding carved out portions. In the context of carving, smaller, better-quality models may be known as chisels. These chisels carve the larger block to create space for the insertion of the smaller portion.

While the present invention is described herein with reference to the illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

In the detailed description of embodiments that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1A:
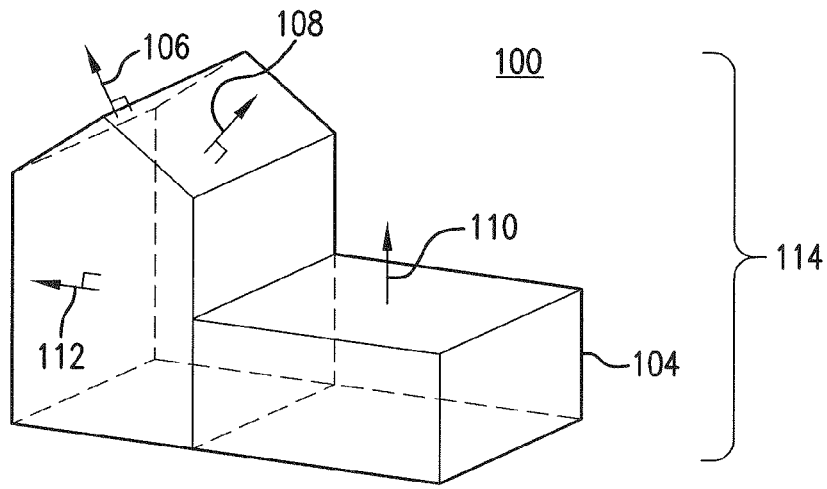
FIG. 1A illustrates an exemplary three-dimensional model.
Figure 1B:
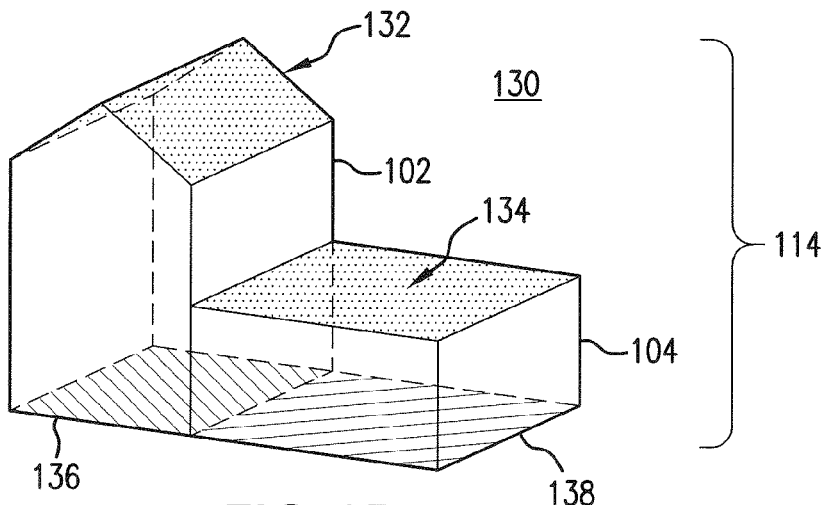
FIG. 1B illustrates an exemplary three-dimensional model with two shaded roof surfaces.
Figure 1C:
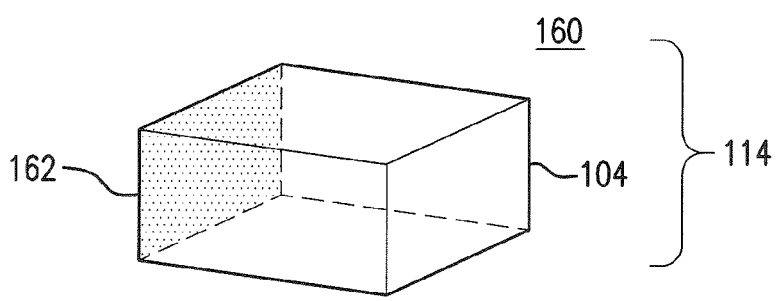
FIG. 1C illustrates an exemplary three-dimensional model of a singular building with a shaded vertical wall.

FIGS. 1A-C show diagrams illustrating carving a building from a model of a block according to an embodiment. FIG. 1A shows a diagram 100 of block 114. As shown in diagram 100, block 114 has various surfaces. The orientation of each surface may be determined. To determine a surface's orientation, a normal vector, such as vectors 106, 108, 110 and 112, may be used. As described with respect to various embodiments, surface vectors may be used to determine roof portions of a building that is part of a larger city block model. In diagram 100, surface normal vector 112 is generally in a horizontal direction. Thus, the surface from which surface normal vector 112 begins may be classified as a wall of a building. Surface normal vectors 106 and 108, however, project in a generally vertical direction. Thus, surface normal vectors 106, 108, and 110 may correspond to roof surfaces of block 114. Additionally, surface normal vector 110 may correspond to a roof surface of building 104. The roof surfaces are illustrated in FIG. 1B.

FIG. 1B shows a diagram 130 illustrating use of the roof surfaces of block 114 to identify buildings in block 114. Each set of continuous roof surfaces may correspond to a building. For example, roof surface 132 may be identified by first determining surface normal vectors 106 and 108 for each surface. Then, since the two surfaces corresponding to each surface normal vector share an edge, they may correspond to the same building. In this way, a first building 102 corresponding to roof surface 132 may be identified. Similarly, roof surface 134 is identified by surface normal vector 110, and similarly corresponds to a second building 104.

Using the roof surfaces, footprints of each building on the block may be determined by projecting the roof surfaces of buildings 102 and 104 onto a representation of the ground in the three-dimensional environment. Using the footprints, which building to carve out may be determined. A more detailed model is placed in the space freed by carving. In an embodiment, if an amount of overlap between a footprint, a building in block 114 and a footprint of the more detailed model exceeds a threshold, the building may be removed. For example, an amount of overlap between footprint 136 and a more detailed model may exceed a threshold. In that example, building 102, which corresponds to footprint 136, may be removed as illustrated in FIG. 1C.

FIG. 1C shows a diagram 160 illustrating carving building 102 out of block 114. Surface 162, indicated by shading, is a vertical surface that may overlap with a separate building, in this case, building 102. In the examples that follow, surface 162 may need to be filled in on the overlapping building 102.

In this way, as illustrated in FIGS. 1A-C a model of a building may be carved out of a model of a city block to make way for a more detailed model of the building. A system for carving building models as illustrated in FIGS. 1A-C is shown in FIG. 2.

System

Figure 2:
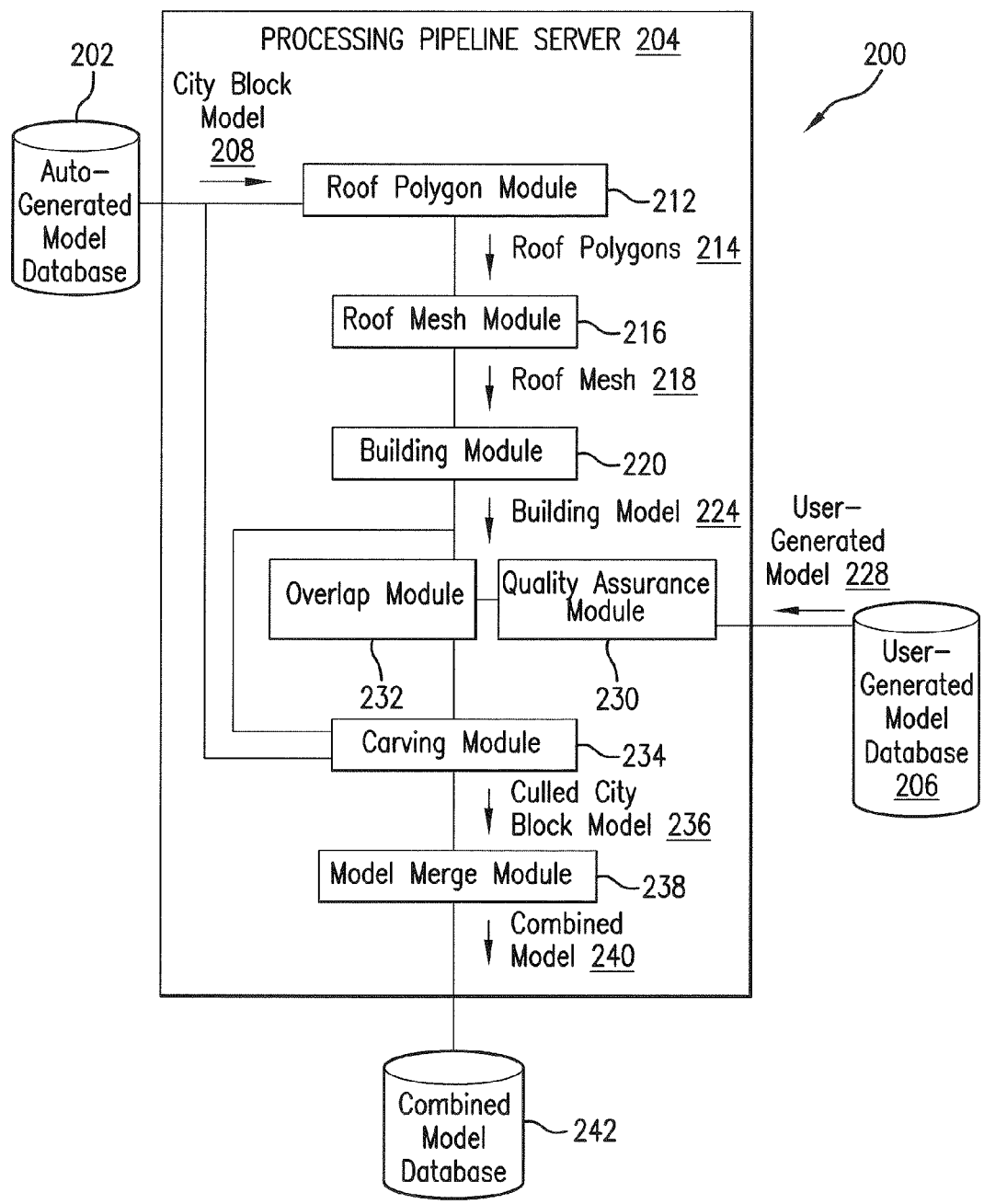
FIG. 2 illustrates an exemplary system for carving a building from a three-dimensional model, in accordance with an embodiment.

FIG. 2 is a diagram of a system 200 that may be used to implement embodiments described herein. System 200 may include an auto generated model database 202, a user-generated model database 206, a processing pipeline server 204, and a combined model database 242.

In general, processing pipeline server 204 may receive a city block 208 from auto generated model database 202 and a user-generated model 228 from user-generated model database 206. Then, processing pipeline server 204 may remove overlapping portions of the building modes and combine the models to produce combined model 240. Combined model 240 may be stored in combined model database 242. Each of the components and their subcomponents are described in detail below.

Auto-generated model database 202 may contain automatically generated models for buildings or city blocks generated from images or other sources. Automatically generated models from database 202 may be used to create a city block model provided to processing pipeline server 204.

Once processing pipeline server 204 receives city block model 208, processing pipeline server 204 may use a roof polygon module 212, a roof mesh module 216, and a building module 220 to identify buildings within city block model 208. Roof polygon module 212 may be used to identify roof polygons 214 of buildings and models provided by database 202. For example, roof polygon module 212 may determine the surface normal vectors of various surfaces in the models provided by database 202, and identify roof polygons when corresponding surface normal vectors are directed in a vertical orientation.

Roof polygons 214 identified by roof polygon module 212 are provided to roof mesh module 216. Using identified roof polygons 214, a roof mesh may be created by determining roof polygons 214 that share an edge, or by determining discontinuities between identified roof polygons 214.

Roof meshes 218 identified by roof mesh module 216 may be provided to building module 220. Building module 220 may use the roof meshes 218 to determine corresponding buildings, for example and without limitation, by computing a three-dimensional volume above the ground surface of the three-dimensional model and below the roof mesh polygons. The corresponding buildings are represented as a building model 224.

With buildings identified from city block model 208, processing pipeline server 204 may use various sub-modules, including a quality assurance module 230, an overlap module 232, carving module 234, and a model merge module 238 to combine city block model 208 and user-generated model 228.

User generated models 228 may be stored in user generated model database 206. User generated models 228 may be provided to quality assurance model 230. Quality assurance module 230 may evaluate user generated models 228 to determine whether they are more detailed, superior or more accurate than a representation of a portion of a city block model 208 from auto-generated model database 202. Quality assurance module 230 may involve a human operator examining user-generated model 228 and comparing it with models that are already available.

If quality assurance module 230 approves of user generated model 228, it may be provided to overlap module 232. Overlap module 232 may compare the placement of user generated model 228 and building model 224 to determine the amount of overlap between the two models. For example, overlap module 232 may determine a first area of the ground projection of a portion of a city block model 208 generated from auto-generated model database 202. Overlap module 232 also may determine a second area of the ground projection of a portion of a user generated model 228. Then, overlap module 232 may determine a ratio of the first area and second area to determine an amount of overlap of the two buildings.

Based on the amount of overlap determined by overlap module 232, carving module 234 may chisel or cull a portion of city block model 208 that represents building model 224 in order to make space to insert a user-generated model 228. Carving module 234 may output a culled city block model 236.

Model merge module 238 then may take culled city block model 236 and user-generated model 228 and combine the two into combined model 240. Model merge module 238 may also insert a vertical surface into the culled city block model 236 to close a hole in the city block model left as a result of carving module 234. Combined model 240 may be provided to combined model database 242.

In this way, combined model database 242 may have both the breadth of models available in auto-generated model database and the detail of the models stored in user-generated model database 106. The models stored in combined model database 242 may be available to a user to view via a geographic information system client (not shown).

Processing pipeline server 204 may be implemented on any computing device. Such computing device can include, but is not limited to, a personal computer, mobile device such as a mobile phone, workstation, embedded system, game console, television, set-top box, or any other computing device. Further, a computing device can include, but is not limited to, a device having a processor and memory for executing and storing instructions. Software may include one or more applications and an operating system. Hardware can include, but is not limited to, a processor, memory and graphical user interface display. The computing device may also have multiple processors and multiple shared or separate memory components. For example, the computing device may be a clustered computing environment or server farm.

Each of the modules shown in processing pipeline server 204 may be implemented in hardware, software, firmware, or any combination thereof.

Each of databases 202, 206, and 242 may be any type of structured memory, including a persistent memory. In examples, each database may be implemented as a relational database.

Method

Figure 3:
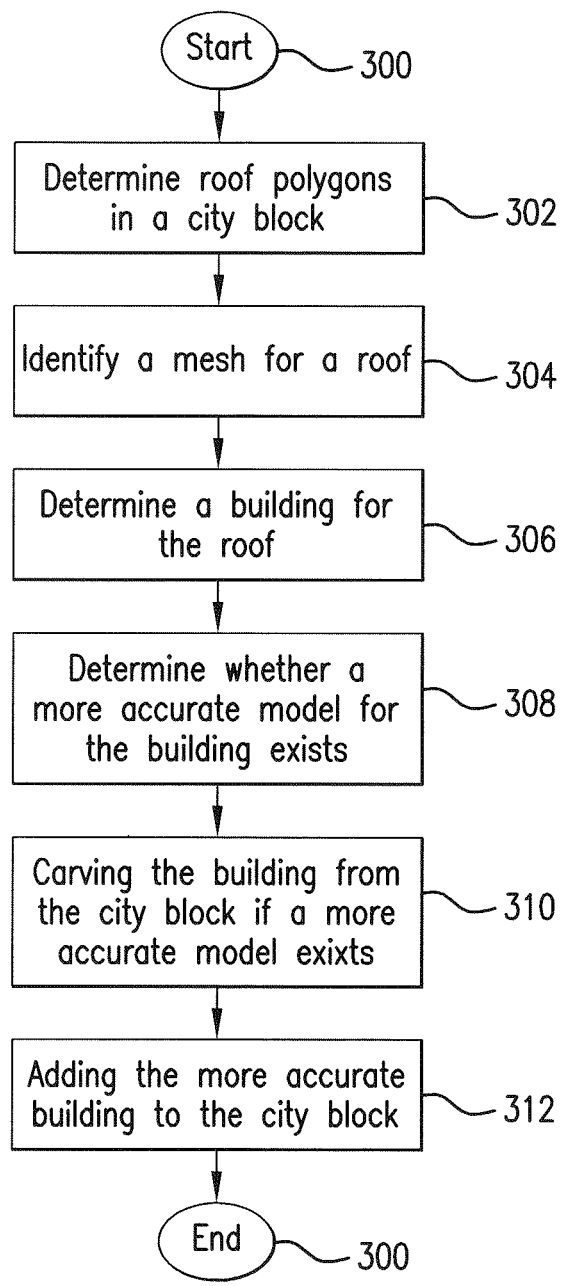
FIG. 3 is a flow diagram of a method of carving a building from a three-dimensional model, in accordance with an embodiment.

In an embodiment, an exemplary method for replacing a less-detailed building representation with a more-detailed building representation in a three-dimensional environment is disclosed. The three dimensional environment may represent a city block or a collection of city blocks with representations of various buildings displayed. FIG. 3 is an illustration of a method 300 for inserting a more-detailed representation of a building in an image or map. Method 300 may, for example, be used in operation of the system of FIG. 2.

Method 300 begins at step 302. At step 302 of method 300, roof polygons for buildings in a city block are determined. Roof polygons may be determined by calculating the surface normal vectors of the various surfaces in the city block. Surface normal vectors pointing horizontally generally correspond to vertical walls of buildings. Thus, the calculated surface normal vectors that are not horizontal may correspond to roof polygons in the city block. According to an additional embodiment, surface normal vectors with an angle from vertical that exceeds a particular threshold may identify roof polygons.

The identified roof polygons are then used to identify a mesh for a particular roof or roofs at step 304. For example, a mesh for a particular roof may include two or more roof polygons that share edges. If roof polygons have discontinuous edges, the polygons are likely part of two separate roofs and would be part of separate roof meshes. In an embodiment, the roof mesh may be a continuous mesh where each roof polygon shares at least one edge, and the perimeter of the mesh is defined as one or more edges which are not connected to any other roof polygon.

Each mesh for a particular roof may correspond to a particular building. For each roof mesh, at step 306, a three dimensional volume portion of a model, representing a building, is identified. The three dimensional volume may be identified by determining the portion of the three-dimensional model to be the set of points positioned at and beneath the roof mesh of polygons and above the ground of the three-dimensional environment.

At step 308, whether a more accurate model for a building identified in step 306 exists is determined. For example, a building corresponding to a roof mesh identified in step 306 may be automatically generated by software. In an embodiment, a user generated model for the building may include more detail than the automatically generated model, which would provide a more accurate picture of the buildings in the city block. If such a model exists, the method may proceed to step 310. In an embodiment, a user generated model is evaluated to determine whether it is more accurate than an existing model for a building.

At step 310, if a more accurate model for a building identified in step 306 exists, the overlapping building identified in step 306 is removed from the existing city block.

At step 312, the more accurate model of the building, for example, the user generated model, is added to the city block in the space created by the carving.

In an embodiment, determining which building to be carved from the existing city block may depend on the overlap between the building to be inserted and the existing building. For example, if the amount of overlap of a building to be inserted and an existing building exceeds a specified threshold, the existing building may be carved out to create space for the inserted building. The threshold amount of overlap may be defined as a ratio of overlap between the area of the ground projection of the existing building and the area of the ground projection of the building to be inserted. In an embodiment, the threshold is a ratio of 0.5. Depending on the implementation of embodiments, the threshold may be adjusted accordingly.

In an embodiment, once an existing building is carved from a three-dimensional city block model, a vertical surface or a portion of a vertical surface may be missing from the city block model. This may be because in the less-detailed model, two buildings may have been represented as contiguous, while a user-generated model may have been placed in a way such that the two buildings are not contiguous and a space exists between the two buildings. Thus, in an embodiment, a vertical surface is inserted into the missing portion of a vertical surface to close the hole in the three-dimensional city block model.

Example Operation

Figure 4:
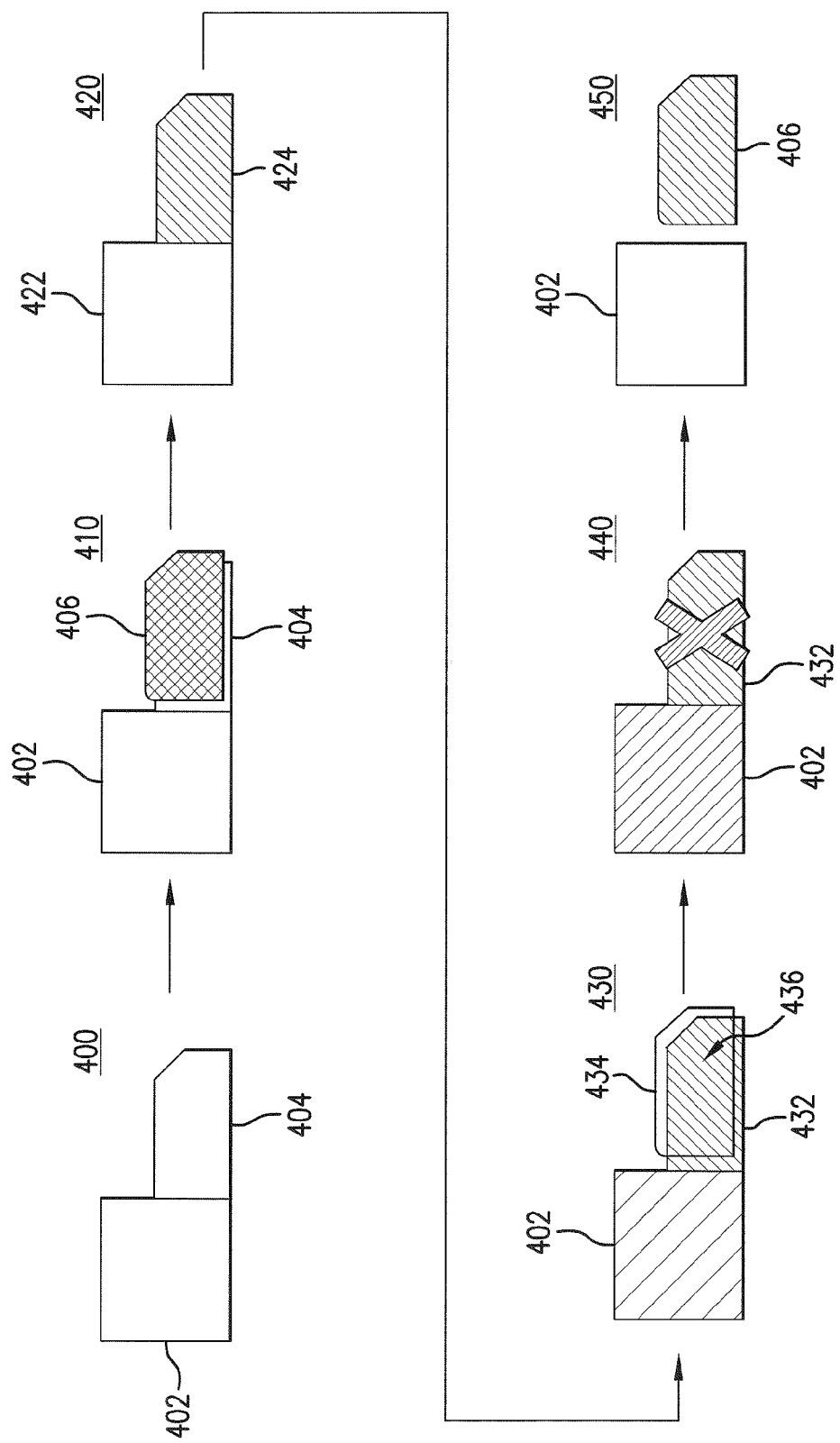
FIG. 4 is diagram illustrating an exemplary execution in accordance with various embodiments.

FIG. 4 shows top-down diagrams illustrating an example of an insertion of a more detailed building into a less detailed set of two buildings, using the carving process described with respect to FIG. 3. At diagram 400, a portion of a city block is shown from above displaying two buildings, building 402 and building 404, present in a three-dimensional model.

At diagram 410, a more detailed representation of a building 406, for example, a user generated building model, is brought into view to be inserted into the three-dimensional model of the city block. The user generated building model 406 may act as a chisel to carve out space to be inserted.

To determine which portion of the three-dimensional model is to be carved out, at diagram 420, roof polygons of each building are identified, as described with respect to step 302 of method 300. Using the roof polygons, building volumes 422 and 424 are determined, which are indicated by the diagonal lines in each corresponding building 402 and 404. Building volumes 422 and 424 each represent a singular building in the three-dimensional model.

In diagram 430, the ground areas of the two buildings are determined. Ground area 432 corresponds to building 404, while ground area 434 corresponds to building 406. Because building 406 was placed overlapping building 404, and the overlap of the ground areas 432 and 434 may exceed a threshold, it may be determined that building 404 is to be replaced by building 406.

Thus, in diagram 440, the building part corresponding to ground area 432 is removed.

Then, in diagram 450, the more detailed three-dimensional building 406 may be merged with the existing three-dimensional city block model into the position in which it was intended.

The summary and abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation and without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments.

What is claimed is:

1. A computer-implemented method for carving a building from a first three-dimensional model comprising a plurality of polygons representing a plurality of buildings in a three-dimensional environment, comprising:
   (a) determining which of the plurality of polygons represent a portion of a roof or a non-roof feature based on an orientation of the respective polygon;
   (b) identifying a mesh of polygons representing at least a portion of a roof of a building in the plurality of buildings from among the polygons determined in (a) using discontinuities between the polygons determined in (a);
   (c) determining, based on the mesh of polygons identified in (b), a volume of the first three-dimensional model, the volume representing the building;
   (d) determining an amount of overlap between each roof component of the first three-dimensional model determined in (c) and a second three-dimensional model representing the building;
   (e) culling the volume determined in (c) from the first three-dimensional model to carve the building from the first three-dimensional model; and
   (f) merging the culled first three-dimensional model and the second three-dimensional model,
   wherein the culling (e) and the merging (f) occur when the amount of overlap determined in (d) exceeds a threshold.

2. The method of claim 1, wherein the second three-dimensional model represents dimensions of the building more accurately than how the first three-dimensional model represents the dimensions of the building.

3. The method of claim 2, wherein the second three-dimensional model is user-generated and the first three-dimensional model is automatically generated without user intervention.

4. The method of claim 1, wherein the determining (c) comprises determining the portion of the first three-dimensional model to be points positioned at and beneath the mesh of polygons above a representation of a ground in the three-dimensional environment.

5. The method of claim 1, wherein the determining (d) comprises:
   (i) projecting the at least a portion of the roof determined in (c) onto a representation of a ground in the three-dimensional environment to determine a first area;
   (ii) determining a second area of the ground of the three-dimensional environment occupied by the second three-dimensional model; and
   (iii) determining the amount of overlap to be a ratio of the first area that overlaps with the second area.

6. The method of claim 5, wherein the threshold is 0.5.

7. The method of claim 1, wherein the identifying (b) comprises identifying the mesh of polygons to be a continuous mesh, wherein each polygon in the mesh is connected to at least one other polygon in the mesh of polygons and a perimeter of the mesh of polygons is where an edge of a roof polygon determined in (a) is not connected to any other roof polygons determined in (a).

8. The method of claim 1, wherein the first three-dimensional model represents a city block.

9. The method of claim 1, further comprising:
   (e) inserting a surface into the first three-dimensional model culled in step (d) to cover a hole in the first three-dimensional model left from culling the portion in (d).

10. The method of claim 1, wherein the determining (a) comprises:
    (i) determining a plurality of vectors normal to respective polygons in the plurality of polygons;
    (ii) determining an angle from vertical for each of the plurality of vectors; and
    (iii) determining that a polygon in the plurality of polygons represents a portion of a roof when the angle determined in (ii) for the vector normal to the polygon exceeds a threshold.

11. A system for carving a building from a first three-dimensional model comprising a plurality of polygons representing a plurality of buildings in a three-dimensional environment, comprising:
    at least one computing device;
    a roof polygon module, implemented on the at least one computing device, that determines which of the plurality of polygons represents a portion of a roof or a non-roof feature based on an orientation of the respective polygon;

a roof mesh module, implemented on the at least one computing device, that identifies a mesh of polygons representing at least a portion of a roof of a building in the plurality of buildings, the mesh of polygons identified from among the polygons determined by the roof polygon module using discontinuities between the polygons determined by the roof polygon module;

a building module, implemented on the at least one computing device, that determines, based on the mesh of polygons identified by the roof mesh module, a volume of the first three-dimensional model, the volume representing the building;

an overlap module that determines an amount of overlap between the at least a portion of the roof determined by the building model and a second three-dimensional model representing the building;

a carving module, implemented on the at least one computing device, that culls the volume determined by the building module from the first three-dimensional model to carve the building from the first three-dimensional model; and a model merge module that merges the culled first three-dimensional model and the second three-dimensional model, wherein the carving module that culls the volume and model merge module merges the first and second three-dimensional models when the amount of overlap determined by the overlap module exceeds a threshold.

12. The system of claim 11, wherein the second three-dimensional model represents dimensions of the building more accurately than how the first three-dimensional model represents the dimensions of the building.

13. The system of claim 12, wherein the second three-dimensional model is user-generated and the first three-dimensional model is automatically generated without user intervention.

14. The system of claim 11, wherein the building module determines the volume of the first three-dimensional model to be polygons positioned at and beneath the mesh of polygons and above a ground of three-dimensional environment.

15. The system of claim 11, wherein the overlap module:
(i) projects the at least a portion of the roof determined onto a representation of a ground in the three-dimensional environment to determine a first area;
(ii) determines a second area of the ground of the three-dimensional environment occupied by the second three-dimensional model; and
(iii) determining the amount of overlap to be a ratio of the first area that overlaps with the second area.

16. The system of claim 15, wherein the threshold is 0.5.

17. The system of claim 11, wherein the roof mesh module identifies the mesh of polygons to be a continuous mesh, wherein each polygon in the mesh is connected to at least one other polygon in the mesh of polygons and a perimeter of the mesh of polygons is where an edge of a roof polygon by the roof polygon module is not connected to any other roof polygons determined by the roof polygon module.

18. The system of claim 11, wherein the first three-dimensional model represents a city block.

19. The system of claim 11, wherein the carving module inserts a surface into the culled first three dimensional model to close a hole in the first three dimensional model left from culling the portion.

20. The system of claim 11, wherein the roof polygon module:
(i) determines a plurality of vectors normal to respective polygons in the plurality of polygons,
(ii) determines an angle from vertical for each of the plurality of vectors, and
(iii) determines that a polygon in the plurality of polygons represents a portion of a roof when the angle determined in (ii) for the vector normal to the polygon exceeds a threshold.

* * * * *